Figure 1:
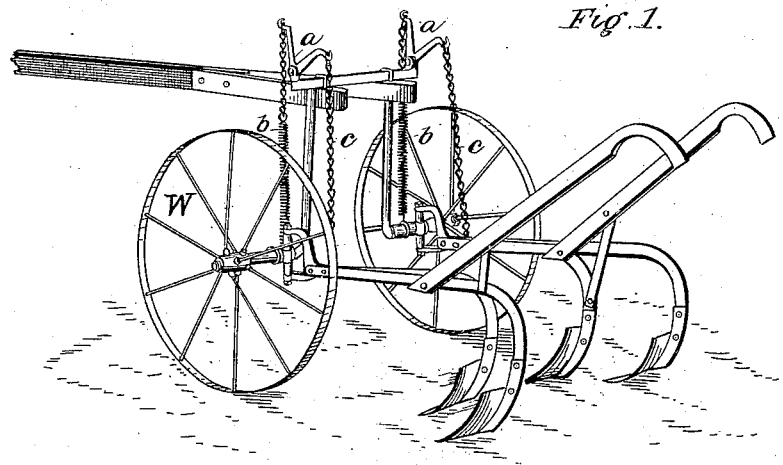

(No Model.)

J. P. BLACK.
CULTIVATOR.

No. 378,651. Patented Feb. 28, 1888.

Witnesses: J. B. Dover. C. W. Davenport.

Inventor: Joseph P. Black
By John Lane, his Atty.

UNITED STATES PATENT OFFICE.

JOSEPH P. BLACK, OF ALTON, ILLINOIS, ASSIGNOR TO THE HAPGOOD PLOW COMPANY, OF SAME PLACE.

CULTIVATOR.

SPECIFICATION forming part of Letters Patent No. 378,651, dated February 28, 1888.

Application filed October 31, 1887. Serial No. 253,918. (No model.)

*To all whom it may concern:*

Be it known that I, JOSEPH P. BLACK, a citizen of the United States, residing at Alton, in the county of Madison and State of Illinois, have invented a new and useful Improvement in Cultivators, of which the following is a specification.

This invention relates to straddle-row cultivators, and has the object to improve the holding and carrying of the plows, whereby they will work more steadily and in a better manner and be more easily operated than heretofore.

This invention has the further object to improve the spring device, whereby the spring will have but little or no lifting force upon the plows when the plows are at work and an increased and stronger lifting force as the plows are elevated in a better manner than heretofore. I am aware that such acting spring devices have been attempted and more or less in use before my invention without really accomplishing the object. My invention overcomes and obviates all the heretofore troubles and objections.

The invention will first be set forth in the specification and drawings, and afterward pointed out in the claims.

In referring to the drawings like letters refer to like parts in all the figures, in which—

Figures 2, 3:
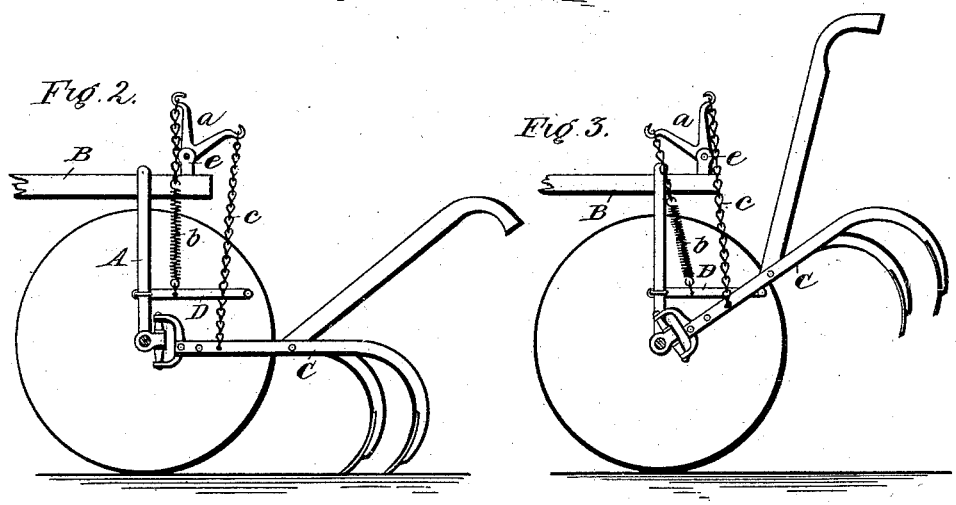
Figures 4, 5:
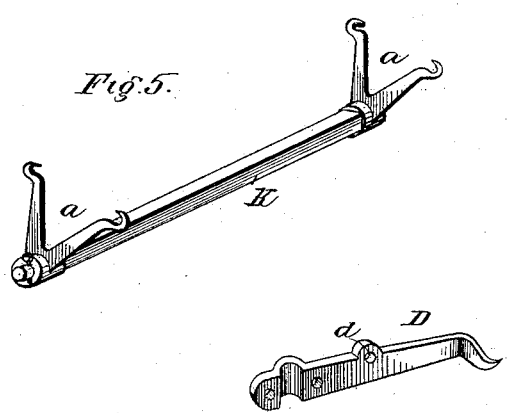
Figure 6:
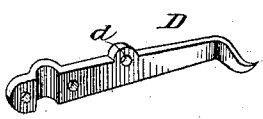

Figure 1 is a perspective view of a straddle-row cultivator in which my improvements are embodied, showing the V-shaped walking-beam $a$, with a spring, $b$, connected to one arm and a suspension-chain, $c$, connected to the other arm of the said walking-beam. Fig. 2 is a side elevation view showing parts of said cultivator with which my invention operates, showing the plows as down, as when in position for working, and the spring $b$ with its two ends connected on a line or nearly on a line with the pivotal center of said walking-beam, whereby the force of said spring may be said to be spent upon a dead-center, and showing the arm to which the suspension-chain is connected extending horizontally. Fig. 3 is a like view as Fig. 2, with the plows elevated in position as when carried, showing how the walking-beam $a$ has moved, and the arm connecting the spring extending horizontally, and the arm connecting the suspension-chain extending upwardly, and the said dead-center transferred from the spring to the suspension-chain. Fig. 4 is a perspective view of the V-shaped walking-beam $a$, showing how it may be constructed with a perforated center, $f$, for connecting with the machine, and with hooks $g$ upon the outer ends of the arms $h$ for connecting the spring and suspension-chain. Fig. 5 is a perspective view of two such said walking-beams $a$ attached to the bar K preparatory to being connected to the cultivator. Fig. 6 is a perspective view of the bracket D, showing how it may be constructed with means (hook or perforation $d$) for connecting the bottom end of said spring.

My improvement may be applied to any ordinary cultivator of either riding or walking species having a frame on wheels provided with plows adapted to be elevated and carried, the said frame having the axle A and tongue B, and W represents the wheels, and C the plows, all of ordinary construction, except as modified to adapt my improvement.

In my improvement, K represents a bracket or bar having its ends provided with seats $e$ for pivotally seating the said walking-beam, and said seats may be ears or brackets $e$, perforated, as will be understood by inspecting Fig. 1, or the ends of the said bar may be rounded and the walking-beam provided with a perforated hub seating directly upon the bar and pivotal thereon, as will be understood by inspecting Fig. 5, and the said bar K may preferably be attached directly to the tongue B, as shown in the drawings, or it may be attached directly to the axle, as desired.

$a$ represents the walking-beam, constructed V-shaped, provided with arms $h$, which are provided with eyes or hooks $g$, and also with a perforated hub or center, $f$, as shown enlarged in Fig. 4.

D represents a bracket provided with means to be attached to the axle, extending rearwardly and curved outwardly, as ordinary. The said bracket D, when used with my improvement, may be provided with the hook or perforation $d$, for connecting the bottom end of the spring $b$, as shown in Figs. 2 and 3. The said bracket D may be attached directly to the axle and made movably adjustable up and down thereon, and its outer end utilized in assisting in supporting the plow in an elevated position, as ordinary, and shown in Fig. 3.

$b$ represents an ordinary spring having its top end connected to one of the arms $h$ of the walking-beam $a$, the bottom end connected to the bracket D, as shown in Figs. 2 and 3, or the said bottom end may be connected directly to other parts, as to the axle, if desired, as shown in Fig. 1, in which case the bracket D may be dispensed with without departing from my invention.

$c$ represents the suspension-chain, which may be an ordinary linked chain, having its top end connected to the arm $h$ of the walking-beam $a$, the bottom end being connected to the plow in rear of its connection with the machine or axle, as shown in the drawings.

In operation I preferably use a linked chain for the suspension-chain, and also a shorter linked chain in connecting the spring to the walking-beam, whereby the chains may be adjustable in length.

The walking-beam, pivotal in its connection with the cultivator, has the position shown in Fig. 2 when the plows are down in position for work, by which the two end connections of the spring and the pivotal center of the walking-beam are on a line or nearly on a straight line, by which the force of the spring is spent on the pivotal center of the walking-beam, forming a dead-center without any lifting force upon the plow, and the other arm $h$ extending horizontally, supporting the suspension-chain, which in such position assists the operator in holding the plow and in gaging the depth of its working. Then, when the operator desires to elevate the plows, a lift on the plow will allow the walking-beam to move and assume the position shown in Fig. 3, as it were, reversing the forces, in which the spring-arm will then extend horizontally and the full force of the spring be exerted to hold the plow elevated, and the said dead-center transferred to on a line or nearly on a line between the two ends of the suspension-chain.

The bracket D may be used to assist the spring in holding the plow elevated, yet the spring may have sufficient force to hold the plow elevated and the use of the said bracket be dispensed with.

It will be observed that the walking-beam arms both extend as a lever, of which the pivotal center $f$ is the fulcrum; that the long arm thereof extends horizontally and the short arm extends upwardly; that the said long arm and short arm change places in the movement of the plow from a working position to an elevated position, as when the plows are down the long arm is with the suspension-chain and when elevated transferred to the spring, all of which will be understood by inspecting the drawings; and it will also be observed that the walking-beam is V-shaped, so that in its movement the said dead-center may be transferred from the spring-arm to the suspension-chain arm, and vice versa, in a reverse movement, which is an important feature in my invention.

Having thus set forth my invention, I claim—

1. The V-shaped walking-beam having two arms extending from their pivoted center at right angles from each other and pivotally connected to the cultivator-frame, and either arm adapted to be turned to a vertical position while the other arm extends in a horizontal plane, in combination with a spring, a chain or rod, and a cultivator drag-bar, substantially as and for the purpose set forth.

2. In a cultivator, the combination, with the frame and drag-bars, of a two-armed walking-beam, a spring, and a suspension-chain, the said spring and chain attached to opposite ends of the walking-beam, and the said chain also connected to the drag-bar and adapted to suspend the plow by the action of the spring, and said walking-beam adapted to be rocked to bring its pivotal center at or near a dead-center or a straight line between the ends of the spring when at work, or between the ends of the suspension-chain when the plows are lifted, substantially as and for the purpose set forth.

JOSEPH P. BLACK.

Witnesses:
HARVEY L. BLACK,
J. E. STAUFER.